United States Patent [19]

Sticht

[11] Patent Number: 4,762,218
[45] Date of Patent: Aug. 9, 1988

[54] PRODUCTION PLANT WITH SEVERAL SINGLE STATIONS

[76] Inventor: Walter Sticht, Karl-Heinrich-Waggerl-Strasse 8, A-4800 Attnang-Puchheim, Austria

[21] Appl. No.: 119,244

[22] Filed: Nov. 5, 1987

Related U.S. Application Data

[63] Continuation of Ser. No. 912,170, Sep. 26, 1986, abandoned, which is a continuation of Ser. No. 695,840, Jan. 28, 1985, abandoned.

[30] Foreign Application Priority Data

Feb. 6, 1984 [AT] Austria .................................. 365/84

[51] Int. Cl.⁴ ............................................. B65G 21/20
[52] U.S. Cl. .................... 198/345; 198/465.2; 198/583; 104/38
[58] Field of Search ................. 198/345, 346.1, 465.1, 198/465.2, 583, 803.01, 803.2, 860.2; 104/38; 238/10 R, 10 A; 29/33 D, 563

[56] References Cited

U.S. PATENT DOCUMENTS

| | | | |
|---|---|---|---|
| 2,903,120 | 9/1959 | Thomas | 198/465.2 X |
| 3,132,930 | 5/1964 | Abbott et al. | 104/35 |
| 3,478,859 | 11/1969 | Krempel et al. | 198/465.2 X |
| 3,854,889 | 12/1974 | Lemelson | 198/348 X |
| 4,014,428 | 3/1977 | Ossbahr | 198/345 |
| 4,147,250 | 4/1979 | Schulz | 198/465.2 |
| 4,209,898 | 7/1980 | Aoki et al. | 198/345 X |
| 4,239,445 | 12/1980 | Ozawa | 198/345 X |
| 4,369,872 | 1/1983 | Sticht | 198/345 |
| 4,513,854 | 4/1985 | Prodel et al. | 198/465.1 |
| 4,515,264 | 5/1985 | Sticht | 198/465.2 |
| 4,687,091 | 8/1987 | Sticht | 198/345 |

FOREIGN PATENT DOCUMENTS

| | | | |
|---|---|---|---|
| 3112911 | 10/1982 | Fed. Rep. of Germany | 198/465.1 |
| 2040244 | 8/1980 | United Kingdom | 198/465.2 |

*Primary Examiner*—Joseph E. Valenza
*Attorney, Agent, or Firm*—Kurt Kelman

[57] ABSTRACT

In a production plant comprising a conveyor line at which each station comprises a machine table for optional reception of devices such as guiding, positioning, arresting, feed, sensor or coding devices, the machine tables, feed devices, guide devices, positioning and arresting device and coding device are constructed as mutually interchangeable modules which may be releasably coupled in desired work stations. The work stations are formed at tables comprising conveying, deflector or manual work station modules equipped with reception devices for the device modules and the coupling members for the station modules are arranged and constructed in the same manner.

As a result the station module may be interchanged and it is possible to set up or change production plant with facility. The station modules are formed of substantially identical parts releasably assembled.

10 Claims, 6 Drawing Sheets

PRODUCTION PLANT WITH SEVERAL SINGLE STATIONS

This is a continuation of my abandoned application Ser. No. 912,170, filed Sept. 26, 1986, which is a continuation of abandoned Ser. No. 695,840, filed Jan. 28, 1985.

FIELD OF THE INVENTION

The invention relates to a production plant having several stations, in particular for the assembly of workpieces formed by two or more separate parts, wherein each separate station comprises a machine table having means for receiving guiding, positioning or arresting and feed mechanisms as well as if desired reading or conding devices for code symbols allocated to workpiece carriers.

DESCRIPTION OF THE PRIOR ART

Production plants are already known which comprise several separate stations for example from U.S. Pat. No. 4,492,297. These separate stations are equipped with machine tables having means for receiving guiding devices or devices for positioning, arresting and conveying workpiece carriers for machining or assembling of workpieces situated thereon.

Another known production system according to U.S. Pat. No. 4,014,428 comprises several separate stations. Its disadvantage is that the feed, guiding, positioning and arresting devices allocated to each station, are situated at different points and are differently attached, so that it is hardly possible to establish a unitary structure of the production system and above all to perform a rapid interchange of separate stations.

OBJECTS AND SUMMARY OF THE INVENTION

An object of the present invention is to devise a production plant in which the separate stations can be used for the most diverse cases of application, may be exchanged rapidly and have a high degree of reusability. Such a production plant should be constructed with as many identical parts as possible.

In production plants comprising individual stations for the production of workpieces comprising several individual components in which each individual station comprises a machine table having means for receiving such devices as guiding, positioning and arresting, feed, and optionally sensor or coding devices for code symbols allocated to workpiece carriers, according to the invention, the machine tables, the feed device, the guiding device and the positioning and/or arresting device and the optional coding device are constructed as mutually interchangeable modules connectible by means of coupling members of corresponding structural form, and conveying, deflecting or manual working modules are equipped with reception devices for the other modules and the coupling members of the station modules are arranged and constructed in the same manner. The unexpected advantage of the inventively constructed production plant consists in that the separate stations may be optionally interchanged since the individual components and ancillary parts may be joined together in a modular manner by means of coupling members of corresponding structural form. This renders it possible to set up such production plants rapidly with a minimum number of different parts, a large proportion of the components utilised being reusable and applicable for manufacture of another product, in case of modifications of a product or of setting up a product. Furthermore, this inventive production plant for the first time establishes the possibility of securing an appropriate flexible automation in the assembling sphere, since the corresponding individual stations may already be utilised as a manual operating place as early as the start of the zero series, and may be complemented by refitting or complementations into a wholly automatic production plant for maximum production figures, whilst continued use may be made of the already existing plant sections.

According to another feature of the invention, provision is made for the machine table to be constructed as a conveying module comprising a guiding track module with a continuous rectilinear guiding device for the workpiece carriers. Thanks to the modular structure, rectilinear guiding tracks of any desired length may be obtained by means of several consecutively positioned conveying modules.

It is advantageous moreover for the machine table to be equipped with two guiding track modules for two intersecting guiding devices for the workpiece carriers, as well as a rotary plate module whereby the straight guiding tracks may be closed into loop-like guiding tracks or equipped with parallel guiding tracks or the like.

It is especially advantageous moreover for the conveying and/or deflecting modules to form a continuous guiding device for a production plant, since a complete production plant comprising a circulating guiding track may thereby be produced with only two differently constructed modules.

According to another embodiment of the invention, provision is made for the deflector module to have a square table plate module and for the conveyor module to have a rectangular table plate module, the longer end edge of the rectangular table plate module having the same length as the end edge of the square table plate module of the deflector module and a width of the rectangular table plate module being a little smaller than its length. Space is consequently still left between the mutually facing rear sides of the conveyor modules of two guiding tracks extending parallel to each other which are joined into a continuous guiding track merely by interpositioning of two deflector modules. Dimensional inaccuracies caused by production tolerances may be taken up thereby and this yields also the possiblility of placing installation modules or the like in this area on the machine table of the table plate or at another point of the conveyor module.

Suitably the distance between a central longitudinal axis of a guiding device of a guiding track module and a rear edge of the table plate module is greater than the distance between the central longitudinal axis and the oppositely situated front edge and the greater distance is suitable greater than half a width of the table plate module. The guiding track of the guiding device consequently extends as close as possible to a forward lateral edge of the table plate, so that access is possible for troubleshooting or for utilisation of the conveyor modules for manual working stations.

Advantageously the distances between the central longitudinal axes of the conveyor devices of the deflector modules and the mutually opposed side edges of the table plate module which extend parallel to the central longitudinal axes are larger by a preferably identical amount then the corresponding distances of the table plate module of the conveyor module. The deflector modules may thereby be coupled in any optional direction to the adjacent guiding modules of conveyor modules and a connection with analogous modules into a closed guiding track may always be established.

Suitably a pivot spindle of the rotary plate module is situated at the point of intersection of the central longitudinal axes of the mutually intersecting guiding devices and preferably on a diagonal of the square table plate module, whereby it is possible to couple the workpiece carrier turning module in optional position to the guiding modules of the conveyor modules.

A manual working station module suitably has at least two table plate modules corresponding to that of the conveyor module, and which are set one behind another in the longitudinal direction of the guiding device, so that the table plates may both be utilised for conveyor modules and for the manual working modules.

Advantageously the machine tables of the deflector and conveyor modules have two vertical plate-like side components which are interconnected via horizontally extending transverse struts and for the table plate modules to be situated on the upper end of the components which extend parallel to the transverse struts and are in open plane, thereby forming a spacially very rigid table module structure.

Advantageously, the plate-like components and the transverse struts for reception of the table plate modules of the deflector and conveyor modules are analogously constructed, so that the different modules required for the production of a production plant according to the invention may thereby be produced with a small number of different individual parts. The degree of reusability of a production plant of this kind is thereby very great.

Provision is suitable made for a manual working station module to have at least two table plate modules of the conveyor modules situated one behind another in the longitudinal direction of the guiding device which are supported on two upright plate-like components provided at the distal end edges of the two table plate modules and a transverse strut having a length corresponding to at least twice the length of the transverse struts of the conveyor module is arranged only in the region of the rear-side edges of the table plate modules, the side edges of the two table plate modules which are directly adjacent to each other are joined via coupling elements arranged on the underside of the table plate in the region of the guiding device and borne via a vertical transverse beam in the region of the transverse strut. This creates an ergonomically advantageous working station under utilisation of the same components as for the conveyor and deflector modules in the area of the manual working station, and also provides appropriate leg room even for seated operatives.

It is moreover also possible according to the invention for the transverse struts of the machine tables of the deflector modules to extend parallel to the longitudinal direction of the guiding devices of the conveying modules, analogous receiving bores being situated for preference in the webs and flanges of the plate-like side components for the coupling means of the accident protection or safety modules, whereby it is also possible to manage with but two differently wrought accident protection or safety modules for the production plant as a whole.

Suitably the accident protection or safety modules are arranged to be positioned by means of brackets or cantilevers to precede the edges of the table plate modules lying closest to the guiding devices. This renders it possible that the manoeuvring space of possible machining or manual working mechanisms such as robots, feed devices or the like in the area of the conveying and deflector modules is also protected by safety modules.

It is advantageous furthermore if columns delimiting the individual accident prevention modules have allocated to them a monitoring or checking module outside the safety plates, since failures which are merely attributable to the control device may thereby be put right from the outside without a complete stoppage of the operations of the conveying module.

Advantageously the table plates of the conveying and/or of the deflector module may be made mutually exchangeable and to have a symmetrical drilling pattern on the two surfaces turned away from each other, so that it is possible to cope with one table plate for leftward and rightward running, and for the different separate part to be exchanged for each other and assembled together in optional manner.

Furthermore, it is possible for the table plates of the conveying and/or deflector module to be constructed in mutually interchangeable manner and to have a symmetrical drilling pattern on the two surfaces turned away from each other. This embodiment of the table plates renders it possible in a very advantageous manner to secure substantial reductions of the periods for installing such conveying or deflector modules. For this reason even technically less well trained operatives are enabled to assemble the conveying and deflector modules according to the invention accurately.

It is advantageous moreover for the coding modules to have carriers equipped with opposed identical guiding elements intended for sensing or displacing members which are releasably arranged on a guiding element of a carrier fastened on the table plate, thereby allowing of a rapid exchange or different structure of the separate coding module depending on the different cases of application and conditions at the individual working stations.

Provision is suitable made for the table plate to have an opening in the area of a specified processing point between the guiding bars of the guiding module, and for a positioning or arresting module to be mounted in the opening, the positioning and arresting module comprising a striker plate pivotable around an axis extending parallel to the longitudinal direction of the guiding bars, whereon several bearers for interchangeably insertible stops are arranged consecutively, and for the striker plate to be secured in the housing of the arresting or positioning module and to have allocated to it opositely directed displacing drives situated in a plane extending transversely of the longitudinal direction of the guiding bars, the stops being arranged on the pivoting member for adjustability in the longitudinal direction of the guiding bars. The positioning and arresting module may thereby determine a precise position with respect to the guiding bars.

It is possible for the coupling members to be established by means of bolt-through connections or screw-threaded connections, or by self-centering bayonet strainers, clamps or centering stud systems. Connecting means are advantageous in this connection, which comprise coupling members which allow for a mutual vertical adjustment of the parts after coupling and interconnecting the parts. Since such coupling means are already known in many versions only one will be discribed in relation to the embodiment illustrated and described below.

The solution described for the manufacture of a production plant from but two differently constructed modules, namely the conveying and deflecting modules, is evidently unaffected by the conveying device utilised, i.e. unaffected by the circumstance whether the friction roller drives illustrated in the examples of embodiment are or are not utilised for the feed modules. The advantage of the drives entraining the workpiece carriers by frictional lock consists in that a loose concatenation of the workpiece carriers may be secured in an uncomplicated manner. If the length of the entraining members corresponds to the length of the table plate modules, each conveying or deflector module may be equipped independently with its own driving motor or the like.

BRIEF DESCRIPTION OF THE DRAWINGS

The invention will now be described by way of example with reference to the accompanying partly diagrammatic drawings, in which.

DETAILED DESCRIPTION OF THE PREFERRED EMBODIMENTS

Figure 1:
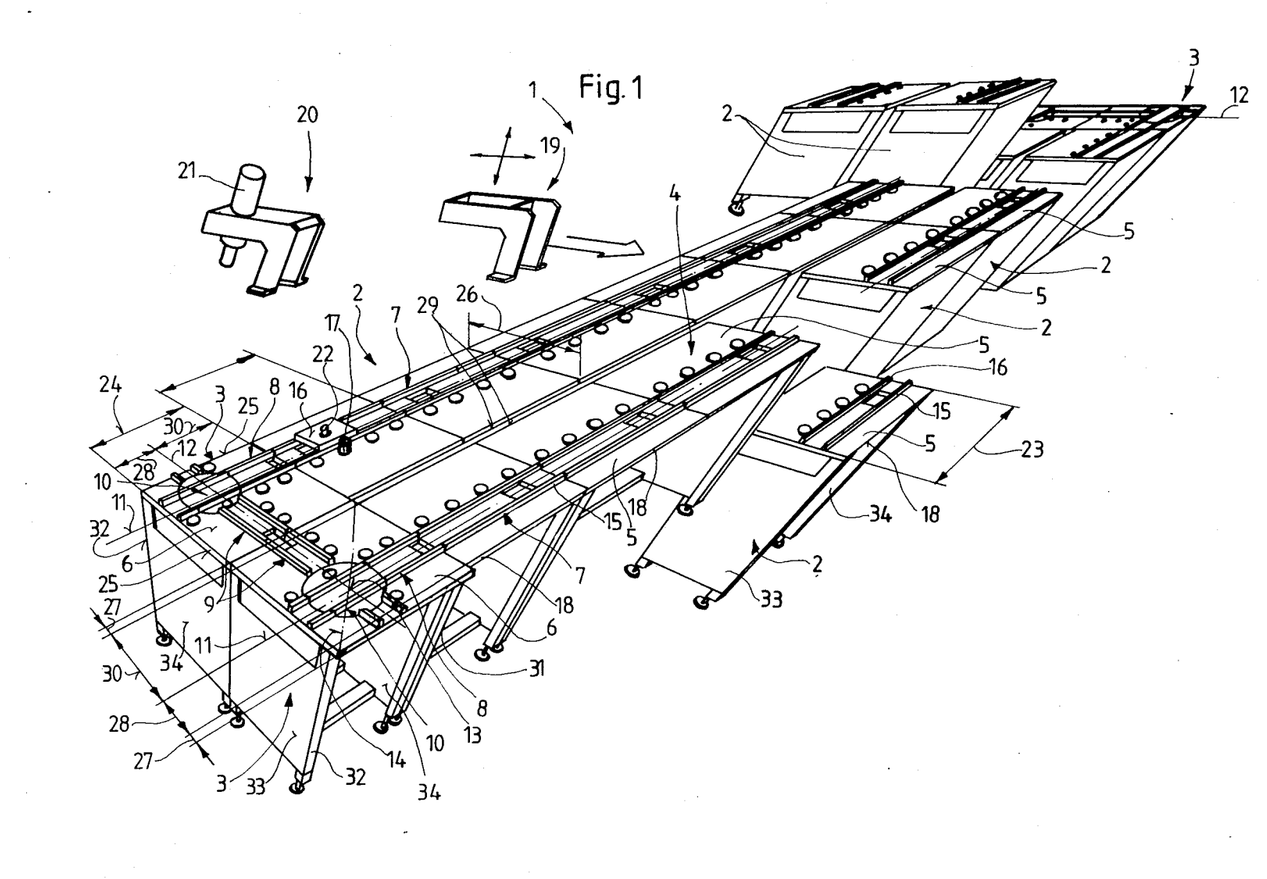
FIG. 1 shows a production plant in accordance with the invention, in a simplified diagrammatical and graphic form.

Referring now to FIG. 1, a production plant 1 comprises several modularly assembled individual stations, the complete production plant comprising two different kinds of individual stations, namely conveying modules 2 and deflector modules 3. A manual working module 4 corresponding substantially in its form to a conveying module 2 is provided, the module 4 incorporating two table plate modules 5 positioned one right behind the other in longitudinal direction and identical to table plate modules 5 of the conveying modules 2.

Guiding track modules 7,8,9 are situated on the upper sides of the table plate modules 5 of the conveying modules 2 and of the table plate modules 6 of the deflector modules 3, the guiding track modules 7 of the front and rear rows of the consecutively positioned conveying modules 2 and guiding track modules 8 and 9 of deflector modules 3 forming two continuous conveyor tracks extending parallel to each other, guiding track modules 9 forming two transverse conveyor tracks extending transversely of the longitudinal conveyor tracks at the opposite ends of the production plant 1. The connection between the longitudinal and the transverse conveyor tracks is established at the deflector modules 3 by means of rotary plate or turntable modules 10. The central longitudinal axes 11 of the longitudinal conveyor tracks and the central longitudinal axes 12 of the transverse conveyor tracks intersect each other at the centres of the turntable modules 10, point of intersection 13 of these central longitudinal axes 11,12 lying on a diagonal 14 of the table plate module 6 of the deflector module 3. Workpiece carriers 16 of which, for the sake of clarity, one only is illustrated in FIG. 1, are guided vertically and laterally on guiding bars 15 of the guiding track modules 7 to 9. The advance of the workpiece carriers 16 along the conveyor tracks formed by the guiding bars 15 is performed by means of feed modules 17, which may for example have rotary friction drives. Feed modules of the nature described in U.S. Pat. No. 4,492,297 are preferred.

As shown diagrammatically, handling modules 19 or processing modules 20, provided for example with screwing mechanisms 21, may be situated beside guiding track modules 7 close to the front end edges 18 of the table plate modules.

As indicated by the laterally offset and lowered or raised conveying modules 2 in FIG. 1, modules may readily be removed from the production plant or subsequently incorporated therein at any time. In this connection the downwardly lowered conveying module 2 could for example be replaced by a deflector module 3 so that workpiece carriers bearing erroneously assembled workpieces 22 could be gated out of the circulatory guiding track.

The production plant 1 may be adapted at any time to a varying production requirement, and may for example initially be equipped with several manual working modules 4 and but few conveying modules 2 upon starting production of a new product in commensurately small numbers of units. In this initial stage of production, essentially only technical operations such as screw cutting, rivetting, pressing, welding and the like are performed in the work areas of the conveying modules 2, whereas the feed and fit movements are performed by hand at the manual modules 4. As production figures are increased, the manual working stations are multiplied and different complex individual components required in greater numbers are then supplied, separated and made ready for manual assembling, in a fully automatic manner. Once the production has then reached the development stage in which production in large series is required, some or all the manual working modules may be replaced in accordance with the output performance required by conveying modules comprising fit and feed mechanisms operated in a fully automatic manner.

A further advantage of the production plant according to the invention consists in that, as production figures are reduced, the plant may be cut back in proportion to the diminishing production figure thanks to the utilisation of a plurality of identical parts and to the easy interchageability of the parts, and may be reorganised for manual working or shut down and disassembled upon completion of the production run of this product, whilst retaining a high degree of reusability of the individual modules in production plant for other products. This production plant thereby meets present-day desiderata for flexible automation of assembling operations and creates the opportunity of allowing the degree of automation of the production or assembling operation to rise in proportion to the production figure to be reached. Furthermore, the cost of investment is reduced thanks to the high degree of reusability of the modules, and the advantages of automation for producing products of higher quality may be fully exploited at low production level.

Figure 4:
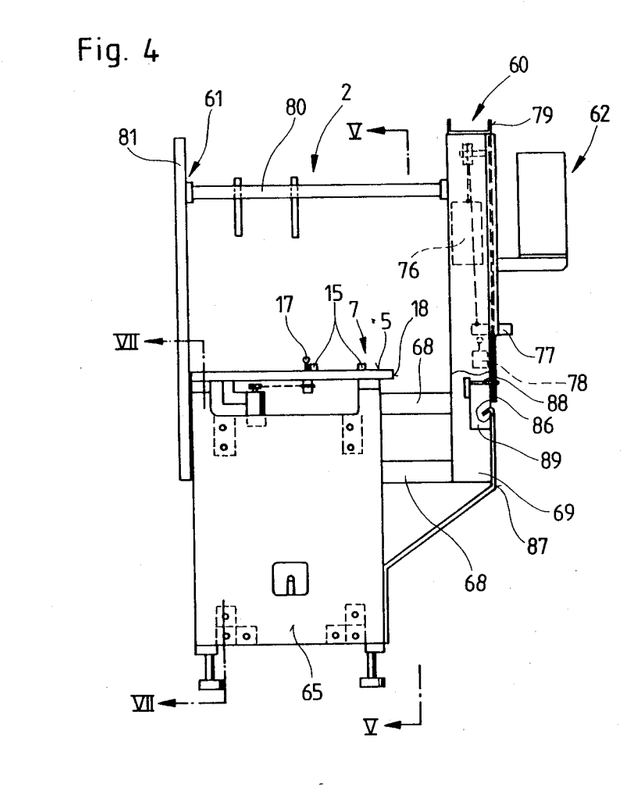
FIG. 4 is a side elevation of a conveying module of the production plant of FIG. 1 with attached safety and monitoring or verification modules.

The dimensions of the table plate modules 5 and 6 for the conveying and deflector modules 2 and 3 are important regarding the possibility of making do with two fundamental types of individual stations, namely the conveying module 2 and the deflector module 3, for a complete production plant. Length 23 of edge 18 of conveying module 2 is thus equal to length 24 of edge 25 of the square table plate module 6 of the deflector module 3. Width 26 of conveying module 2 is smaller by twice the dimension 27 than the length 24 or 23. Also as apparent from FIG. 1, the central longitudinal axes 11,12 of the guiding tracks are assymmetrically positioned with respect to the lateral edges of the table plate modules 5,6. To this end, the central longitudinal axes 11,12 are situated at a distance 28 from the closer edges 18,25, and at a distance 30 from the more distant edges 29. Because the square table plate modules 6 are enlarged in each case by dimension 27 with respect to the central longitudinal axes 11 and 12, respectively, of the guiding tracks, relative to the width 26 of the conveying modules 2, these may be joined to the conveying modules 2 in an optional orientation and a direct connection or continuous guiding track may then be established in each case between two directly adjacent deflector modules 3. The gap formed by virtue of the doubled dimension 27 between the mutually facing edges 29 of the conveying modules 2 may be utilised for access to install plates for plant modules or to lead through conductors. Suitably identical subframes are used for the conveying and deflector modules 2 and 3, for example, as shown, comprising transverse struts 31 connecting identical plate-like side components 33,34 equipped with flanges 32, and in the case of the deflector modules 3 the distal edges 25 terminate flush with the flanges 32 of the side components 33,34, so that the distance between the distal flanges 32 of two adjacently arranged deflector modules 3 corresponds to twice the length 23 of a conveying module 2. The same accident prevention or safety modules shown in FIG. 4 and described below as for the manual working modules 4 and conveying module 2 may thus be utilised for the transversely extending guiding tracks 9 at the terminal extremities of a production plant. The utilisation of the table plate modules for manual working stations too is rendered possible by placing the central longitudinal axes 11,12 of the guiding tracks close to the front edges 18 of the table plate modules 5,6, since the guiding track modules and thus the workpiece carriers 16 may be guided past the operator at an ergonomically correct distance.

Figure 2:
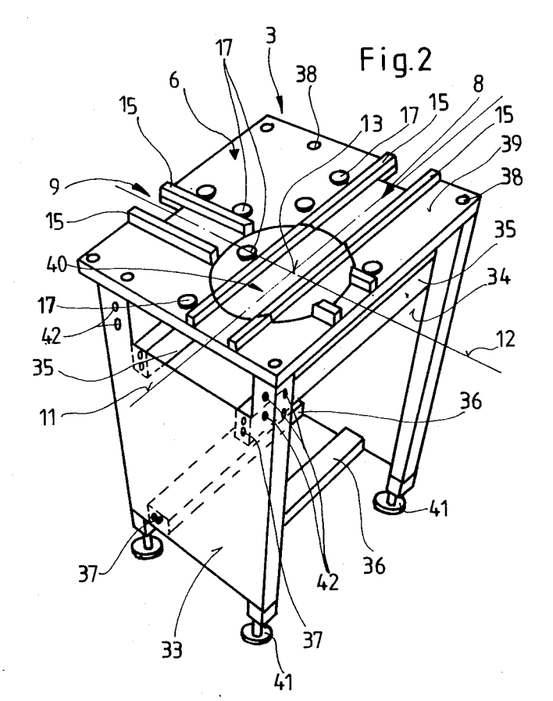
FIG. 2 is a perspective view from above of a deflector module of the production plant of FIG. 1.

A deflector module 3 is shown in FIG. 2. This comprises plate-like side components 33,34 forming two support elements which are interconnected via transverse struts 35,36 extending horizontally at right angles thereto. Connection means 37, e.g. screws, are provided to join the components 33,34 to the transverse struts 35,36. The side components 33,34 have a channel-shaped cross-section. The upper ends of the components 33,34 are releasably joined to the table plate module 6 via connecting means 38. Hexagon recessed head screws arranged in a recessed manner are utilised preponderantly as connecting means.

Two guiding track modules 8,9 for workpiece carriers 16 are arranged on the upper side of a table plate 39. Central longitudinal axes 11,12 of the guiding track modules 8,9 have their point of intersection 13 on a diagonal of the table plate 39. The two guiding track modules are eccentrically positioned on the table plate 39 and comprise two guiding bars 15 symmetrically arranged with respect to the central longitudinal axes 11,12.

A rotary plate or turntable 40 carries guiding bar segments symmetrically arranged with respect to point of intersection 13 and is rotatable thereabout. Feed modules 17 formed by friction roller drives are situated laterally with respect to the guiding modules 8,9.

The side components 33,34 are each provided with a pair of lower adjustable supports 41 and bores 42 are incorporated in flange and web portions of the components 33,34 for connecting adjacently situated modules 2,3.

Figure 3:
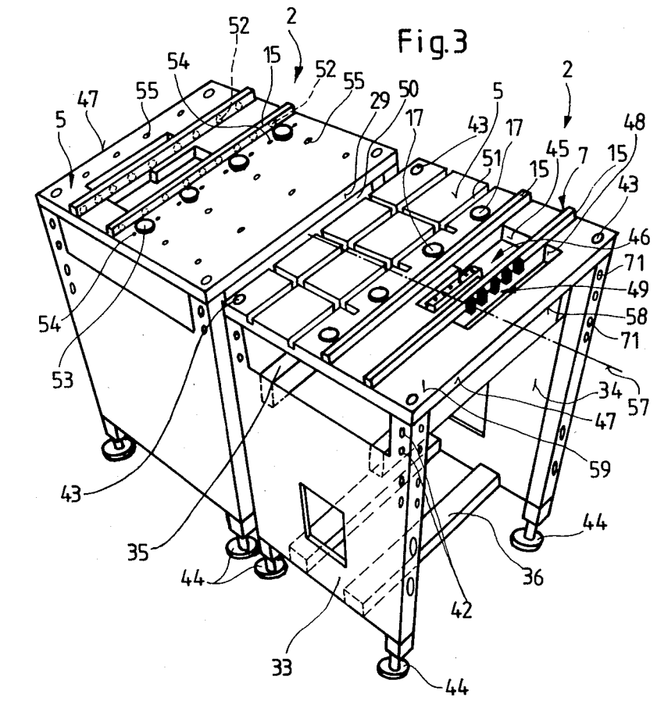
FIG. 3 is a perspective view from above of two conveying modules of the production plant of FIG. 1, allocated to respective ones of two adjacent contra-directional guiding devices of the production plant.

Conveying modules are shown in FIG. 3, and the table plate modules 5 are in each case fastened on two side plate components 33,34 via connecting means 43. The components 33,34 are wholly identical in construction to those of the deflector module 3, so that they may be utilised for assembly of any module. They are connected by corresponding transverse struts 35,36 extending parallel to the table plates 29. These struts 35,36 are of identical and interchangeable construction. Four lower adjustable supports 44 which are joined to the components 33,34 in a vertically displaceable manner via screw-threads are mounted at the lower end of the side components facing away from the table plate module. These four supports 44 allow for displacement for setting the position of the table plate. Bores 42 are situated in the side components for example adjacent to a central recess, for connecting adjacently arranged modules 2 and 3. As apparent, the transverse struts 35 are joined to the side components 33,34 below the recess. In the area of the lower transverse struts 36, openings are formed in the side components, through which supply conductors and the like may be passed between adjacently arranged and interconnected modules.

As also shown diagrammatically, a guiding track module 7 formed by guiding bars 15, and several feed modules 17 are situated on the upper side of the table plate. A recess 45 accommodating a positioning module 46 is situated between the guiding bars 15, and a recess 48 accommodating coding module 49 is situated between one of the guiding bars 15 and a front terminal edge 47. The arrangement of the positioning module 46 and of the coding module 49 will be depicted in greater detail in FIGS. 7 to 10.

As shown diagrammatically grooves 51 extending in the table plate in a constant pattern longitudinally and transversely of the guiding bars 15 may be formed in the table plate between the guiding bar 15 distal from the front edge 47 and a rear edge 50 or 29. These guiding grooves 51 may have any optional cross-section, for example of C-shape or dovetailed or the like, to facilitate installing handling or machining or techinical devices, such as screw-cutting means, rocking or rivetting mechanisms, pressing, punching or like means, on the table plate module 5 and to allow assembling in a stable and positionally precise manner.

Rear conveying module 2 shows that the table plate modules 5 are equipped with an array of bores for reception of the guiding bars 15 and of the feed module 17. Bores 52 arranged behind one another in two rectilinear rows serve the purpose of fastening the guiding bars 15. Bores 53 may be utilised to receive the feed modules 17 and the smaller bores 54 for their attachment. Complementarily, bores 55 for installing or supporting feed mechanisms for parts to be assembled or the like may furthermore be arranged in a row or if appropriate in mutually staggered relation in the region of the front edges 47 of the table plate. It is shown moreover that, instead of the guiding grooves 51, the table plate may have bores 55 arranged in a grid, to allow of positioning and securing auxiliary means such as handling mechanisms, technical means or the like, on the module 2.

The table plate module 5 may be utilised ambilaterally and need merely be pivoted around a central axis 57 centrally arranged with respect to the edge 18, for this purpose. The surface 58 of the table plate module 5 forming the underside on one occasion becomes the upper side upon doing so, whereas the surface forming the upper side 59 then becomes the underside. Since both surfaces 58,59 are equipped with an identical drilling pattern and with depressings or declivities for the coupling devices or coupling means which should not protrude beyond the surfaces 58 and 59 respectively, an optional utilisation of the table plate module 5 is possible at any time without any additional operations. A wider application and economical production of such machine tables is accomplished thereby, so that more versatile tables may be produced in greater numbers and series.

Figure 5:
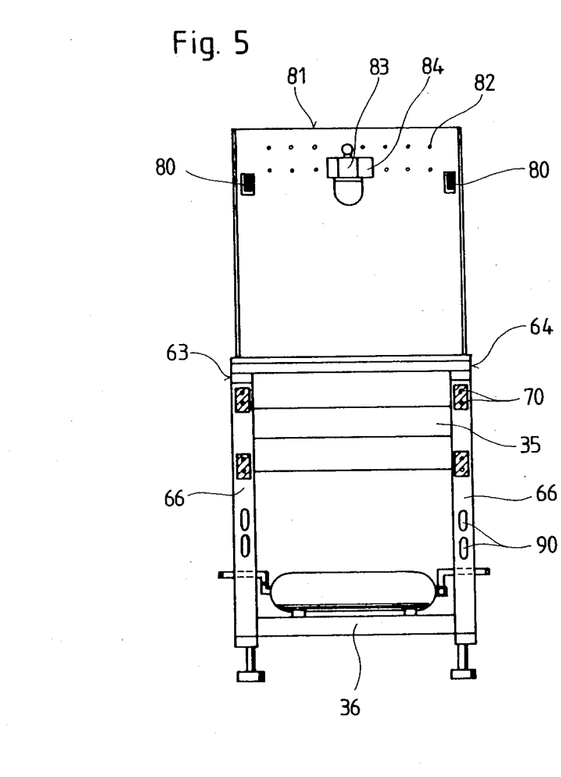
FIG. 5 is an end view of the conveying module of FIG. 4, partially in cross-section along the lines V—V.
Figure 6:
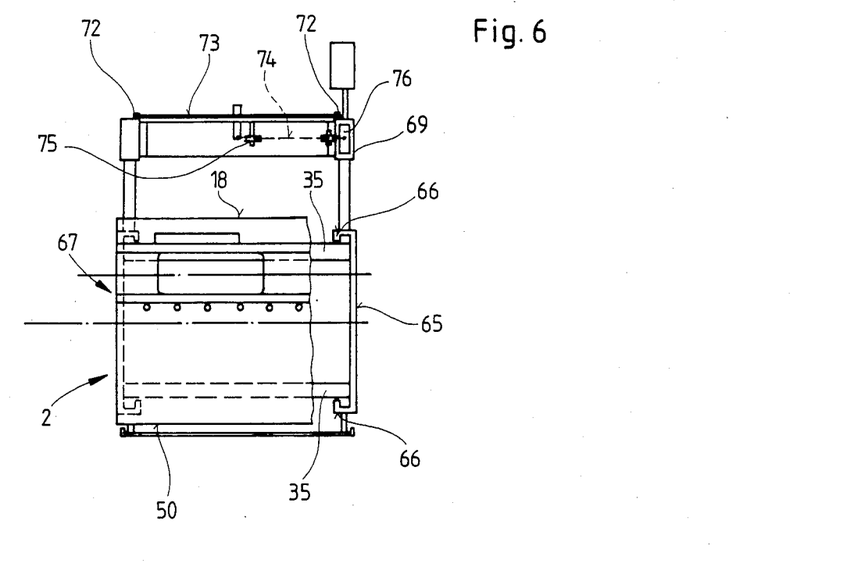
FIG. 6 is a plan view of the conveying module of FIG. 4.

In FIGS. 4 to 7 the conveying module 2 is shown with an accident prevention or safety module 60, an installation module 61 and a verification or monitoring module 62. The advantages of which will now be described. It is apparent from the drawing, that the rear edge 29 and edges 63,64 extend flush with webs 65 and flanges 66 of the side components 67 which are constructed with a channel-shaped cross-section as seen in FIG. 6. This assures that conveying modules 2 arranged one behind another may be placed in direct contact as shown in FIG. 1, and that the installation module 61 may be mounted in an uncomplicated manner. As already described in relation to FIG. 3, the guiding bars 15 of the guiding track modules 7 are situated on the table plate. The feed modules 17 are connected via a chain to a rotary drive installed on the underside of the table plate and are jointly driven by the rotary drive, Columns 69 formed by hollow sections are spaced from the front terminal edge 18 of the table plate and are supported by means of brackets of cantilevers 68. Thanks to the uncomplicated connection of the columns 69 of the safety module 60 via cantilevers 68, it is possible to make allowance for the prevailing requirements such as the movement of handling means for extraction of parts from feed mechanisms etc, and also to accommodate and limit the range of displacement of such devices by means of the safety module.

Figure 7:
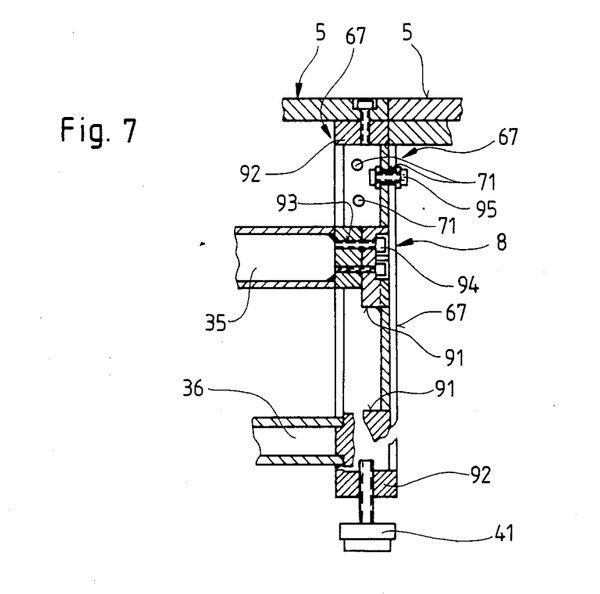
FIG. 7 is a cross-section along line VII—VII of FIG. 4 showing the joints between the plate-like structural element of the table plate and transverse struts.

As more clearly apparent from FIG. 5, the cantilevers 68 formed by hollow sections have their ends equipped with reinforcements into which are screwed releasable coupling elements 70 through the bores 71 provided in the flanges 66 for this purpose—see FIG. 7. The connection between the cantilevers 68 and the columns 69 is similarly established by means of releasable coupling elements, so that these parts may be disassembled for transport or storing. Longitudinal guiding bars 72 are situated on the end side of the columns 69 facing away from the conveying module 2. A protective safety cover plate 73 advantageously produced from a transparent plastics material, for example plexiglass, is displaceably arranged in these longitudinal guiding bars 72. This displaceable protective safety plate 73 is connected via a cable 74 to counterweights 76 which are situated inside the hollow sections of the columns 69. The weight of the protective safety plate 73 is a little greater than the weight of the counterweights 76 running within the columns 69, so that the protective safety plate always tends to assume the closed position. In this closed position, the bottom edge 77 operates a limit switch 78 which is connected to control elements situated in the verification or monitoring module 62 in a manner such that all displacements within the conveying module 2 are stopped by means of a so-called emergency stop safety circuit when the protective safety plate is lifted out of its closed position. Detent means, such as pawls or the like are arranged for mechanical or pressure fluid actuation releasably to secure the protective safety plate in a raised position.

A continuous installation duct 79 wherein the control lines and hoses connecting the verification or monitoring modules 62 of the individual conveying modules may be arranged, is advantageously disposed on the upper side of the columns 69. With appropriate utilisation of hollow sections for securing the verification or monitoring modules 62 on the columns 69, the cables or conductors may be led through the cavities of these sections as far as terminal blocks in the verification or monitoring module.

In their end portions facing towards the installation duct 79, the columns 69 are connected to a rear side plate 81 of the installation module 61 via transverse beams 80. This rear side plate has its end portion facing away from the transverse beams 80 bolted to the flanges 66 of the components 67. As more clearly apparent from the FIG. 5, the rear side plate 81 may be equipped with bores 82 situated in a grid for reception of control and monitoring elements 83, e.g. of a compressed air service unit, as shown diagrammatically. Even if the bores 82 of the grid of holes do not match the fastening drillings of the control and monitoring elements, it is possible in a simple manner to secure these on the rear side plate 81 by means of standardised and prefabricated mounting plates 84. As also denoted in FIG. 4, it is possible to secure additional plates analogous to the rear side plate 81 on the transverse beams 80. The fastening of the transverse beams 80 or rather their connection to the rear side plate 81 or the columns 69, is likewise obtained by means of releasable connecting means with interpositioning of reinforcing plates, similar to the fastening of the cantilevers 68 or of the transverse struts 35,36. The part of the conveying module extending downwards from the bottom edge 77 of the protective safety plate 73 is covered by further safety plates 86,87. To this end, the plates 86 are secured on brackets 89 by means of quick-release connectors 88, e.g. catch-bolts or the like. The bottom plates 87 are suspended in Vee-shaped grooves open towards the bottom edge 77 and are screwed tight in the area of the slots 90 provided in the flanges 66. An accessibility to the conveying modules and coping in an optimum manner with the needs prevailing in a production plant is assured with maximum reliability by this division of the protective safety plate 73 in the upper displaceable safety plate and the lower safety plate 87. In the upper portions in which according to experience most failures occur, for example in the case of handling or feed mechanisms, rapid access is assured by the weight-relieved protective safety plate 73, and also accessibility is rapidly provided to a large extent even in the area of the workpiece carriers by means of the safety plate 76 and the quick release connectors 88.

As apparent from the drawings, the conveying modules 2 in accordance with the invention and having the form of a reinforced housing are not alone in being equipped with plate-like carrying or structural elements, but the same inventive advantages are also exploited for the installation or safety module, whereby a rigid construction is obtained which is of a lightweight form of construction comprising but few components.

The connection of machine tables of two conveying modules 2 as well as the connection of the transverse struts 35,36 to the structural components 67 and the supporting members 91 situated on these, as well as the anchoring of the table plate 29 on the components 67 via anchoring plates 92, are apparent from FIG. 7. The bores for reception of the coupling devices 37 between the components 67 and the transverse struts 35,36 are suitably produced after the support members 91 are welded on. The anchoring elements welded to the ends of the hollow sections forming the transverse struts are equipped with internal screw-threads 93 aligned with the drillings in the support member 91. A massive node is formed by bolting the components 67 to the transverse struts 35 by means of recessed head bolts 94, and a reinforcement of these principal carrying members of the machine table 67 is primarily secured by the incorporation of two support members 91 extending parallel in the upper and lower areas of the components 67. At the same time, it is assured that adjacently situated side components 67 may be placed in areal contact and joined without gaps by recessing the heads of bolts 94. To couple these side components, through-bolts 95 are inserted in the bore 71 and tightened to a predetermined torque after adjusting the directly adjacently situated side components.

This assures a stepless transition between the table plates of adjacently situated side components. The same also applies regarding the guiding bars of the guiding track modules which are then installed on the table plates.

A satisfactory stability is assured by the safe anchoring of the supports 41 in the anchoring plates 92 thanks to the reinforcement of the ends opposed to the table plate in the transition between the web 65 and the flanges 66 of the components 67, since the guided or located length of the supports 41 equipped with a screw-threaded rod is determined by the thickness of the anchoring plates 92 and the length of the screw-thread provided in these, and may be adapted easily to different load conditions.

Figure 8:
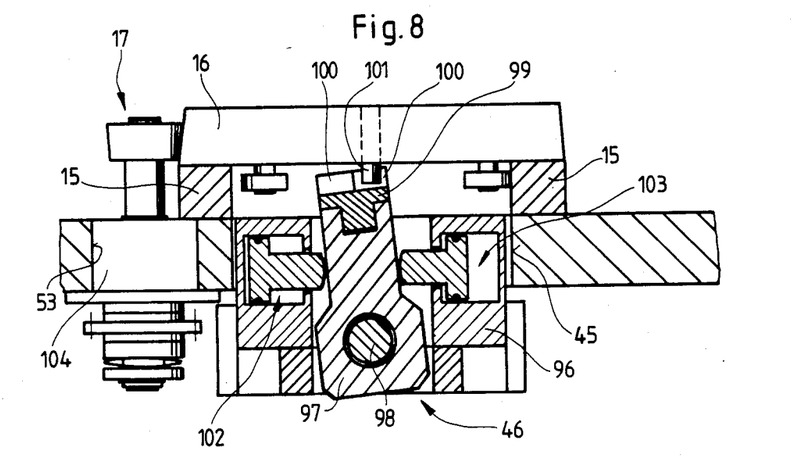
FIG. 8 is an end view of a positioning or arresting module incorporated in a table plate module, partially in cross-section along the lines VIII—VIII in FIG. 9.

The arrangement of the positioning module 46 situated in the recess 45 is shown in FIG. 8. The positioning module 46 comprises a housing 96 wherein is arranged a rocking lever 97 displaceable transversely to the guiding bars 15. The rocking lever 97 is pivotally mounted on a shaft 98 extending parallel to the guiding bars 15 and mounted in the housing 96. A stop carrier plate 99 is adjustably mounted in the longitudinal direction of the guiding bars 15 on the end of rocking lever 97 remote from the shaft 98. Exchangeable inserts acting as stops 100 are arranged on the stop carrier plate 99. These stops 100 cooperate with a positioning stud 101 arranged on the underside of a workpiece carrier 16. By pivoting the rocking lever 98 by means of two cylinder-piston systems 102,103 situated in the housing 96, either of the stops 100 situated in the left-hand half or right-hand half of the stop carrier plate 99 may be placed in engagement with the positioning stud 101. The workpiece carrier 16 may thereby be immobilised in an operating station in several positions along the length of the stop carrier plate, for example for centering several workpieces placed one behind another on the workpiece carrier 16 in the area of a machining mechanism or handling device. An advantageous arrangement of the positioning module 46 is obtained thereby without altering the important setting on the surface of the table plate.

At the same time, it is apparent from FIG. 8 that the feed modules 17 comprising guiding sleeves 104 are inserted into the bores 53 provided in the table plate. A rapid and easy mounting as well as replacement of the feed modules 17 are also assured by this arrangement.

Figure 9:
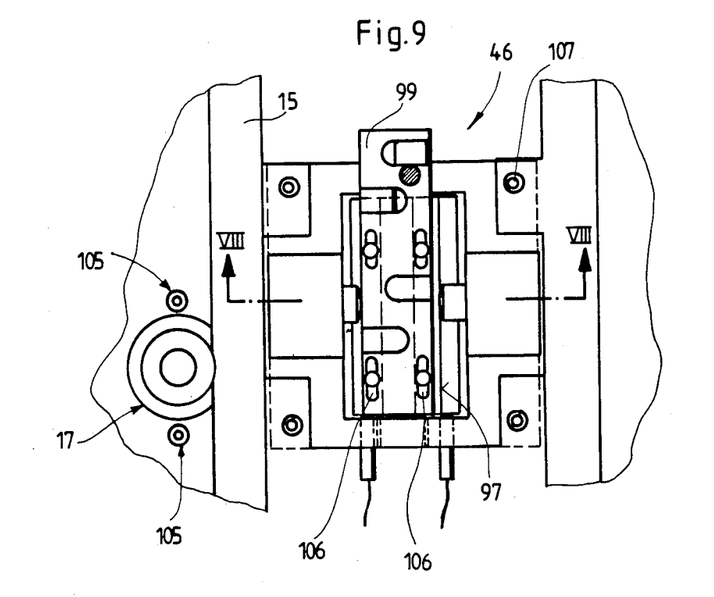
FIG. 9 is a plan view of the positioning or arresting module of FIG. 8.

Coupling members 105, e.g. screws cooperating with screw-threads in the table plate acting as equivalent coupling members, whereby the feed modules 17 are secured on the table plate of the conveying module 2, are apparent from the plan view in FIG. 9.

It is apparent furthermore from the illustration, that the stop carrier plate 99 comprises slots 106 along which it is displaceable with respect to the rocking lever 97 in the longitudinal direction of the guiding bars 15. The whole positioning module 46 is joined via coupling members 107 formed by screws to the table plate of the conveying module 2 which plate has bores positioned correspondingly as equivalent coupling members.

Figure 10:
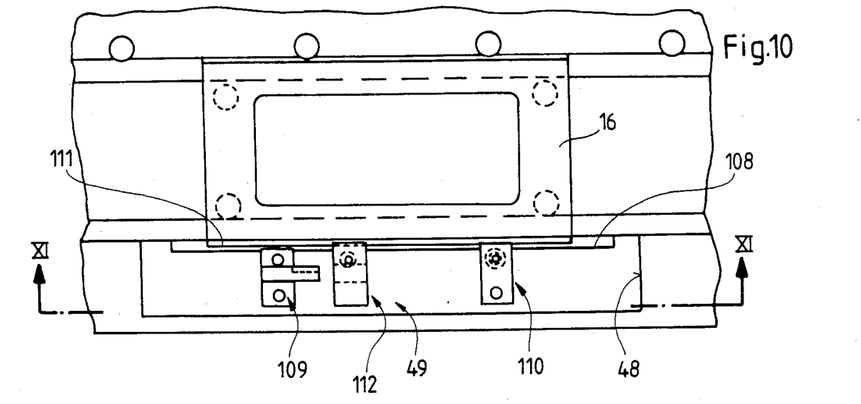
FIG. 10 shows in plan view a coding module which is fastened on the table plate module and intended for the code symbols allocated to the workpiece carriers.
Figure 11:
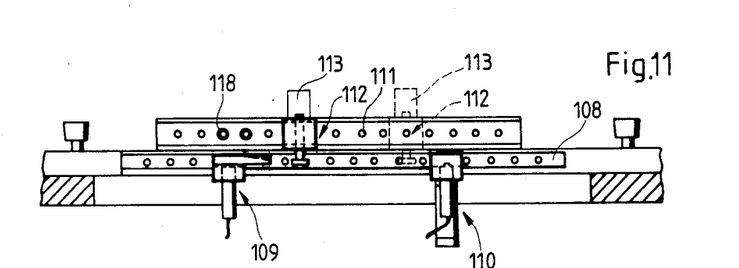
FIG. 11 is a cross-section of the coding module taken along lines XI—XI of FIG. 10.

The arrangement of a coding module 49 in the area of the recess 48—FIG. 3—is shown in FIGS. 10 and 11. Detector devices 109 and displacing devices 110, respectively, are arranged in a perforated bar 108 at intervals corresponding to the perforation pattern of the perforated bar 108. The detector and displacing devices 109,110 are allocated to a code symbol carrier 112 fastened in selectible position on a perforated bar 111 arranged on the workpiece carrier 16. Thanks to the universal displaceability of the detector and displacing devices 109,110 of the code symbol carriers 112, any optional position may be set within the operating area at which the code symbol carrier 112 is to be sensed or displaced. Different operating positions of a workpiece carrier receiving several workpieces 113 may thereby also be set. Thanks to the recess 48, the detector and displacing devices 109,110 extend in the space beneath the table plate and the accessibility of the workpiece carriers or handling devices or other devices on the table plate is not impaired thereby.

Figure 12:
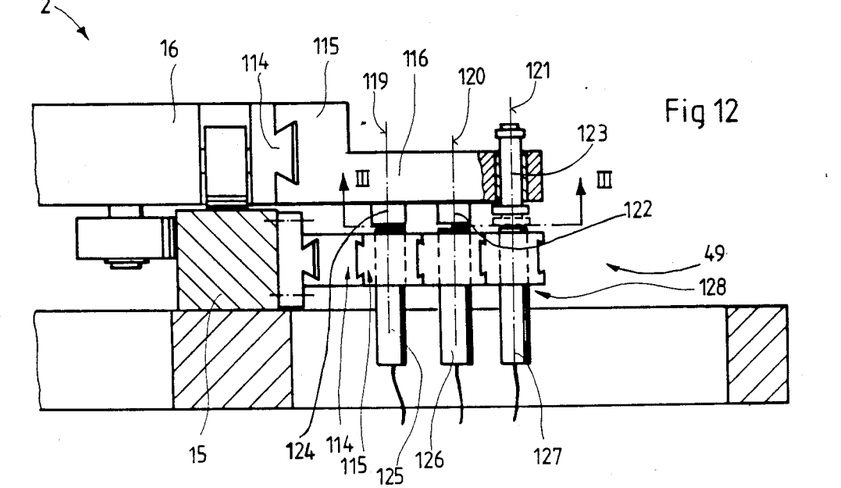
FIG. 12 is an end view partly in section of another form of coding module which is fastened on the table plate module with analogous coupling members.

In FIG. 12, it is demonstrated by reference to another form of embodiment of a coding module 49 for the coding of a workpiece carrier 16 that use is made of the same coupling members 114,115, namely a dovetail guide 114 secured on the workpiece carrier, and the mating element connected to the signal carrier device 116. A coupling member 117 is provided complementarily, whereby the signal carrier device 116 may be secured along the coupling member 114 formed by the dovetail guide in coincidence with the screw-threads 118 situated in the lateral surface of the workpiece carrier. Signal carriers 122 to 124 may be arranged in several rows 119 to 121 on the signal carrier device 116, in several consecutively positioned scanning rows. Beyond this, and as shown in the present example, the signal carrier 123 may be mounted in a vertically displaceable manner in the signal carrier device 116.

A detector or coder device 128 having several sensor elements 125 to 127 allocated to the signal carriers 122 to 124 is coordinated with the signal carriers 122 to 124. These sensor elements are mounted in a dovetail guide fastened on the guiding bar 15 for the workpiece carriers 16. This dovetail guide forms a coupling member 114 which has matching coupling members 115 allocated to it on the individual sensor elements 125 to 127. Each sensor element furthermore also has a coupling member 114,115, so that the sensor elements may be interconnected by means of the same coupling members.

A universal connectibility between the individual parts and the workpiece carrier 16 or the parts rigidly arranged on the conveying module 2 is obtained thereby and it is possible furthermore for different forms of positioning modules 49 to be connected to the workpiece carrier 16 or the conveying module 2 under utilisation of the same coupling members.

I claim:

1. A modular production plant for assembling workpieces comprised of several parts on respective workpiece carriers, which comprises a plurality of successively arranged operating stations including conveying modules for the workpiece carriers, deflector modules for the workpiece carriers and manual working modules for the workpiece carriers, said modules comprising
   (a) a machine table module comprising a table plate module having four edges extending perpendicularly to each other, the machine table module for the deflector module comprising a square table module having a diagonal and the machine table module for the conveying module comprising a rectangular table plate module having two edges extending along a length thereof and two edges extending along a width thereof, the length of the rectangular table plate module being the same as that of the edges of the square table plate module and the width being a little smaller than the length,
      (1) all the rectangular table modules being alike and interchangeable, and all the square table plate modules being alike and interchangeable,
   (b) a guiding track device module on each one of said rectangular table plate modules and two guiding track device modules and a turntable module on each one of said square table plate modules, each guiding track device module and turntable module having a straight continuous track for guiding the workpiece carriers in a conveying direction,
      (1) the guiding tracks having central longitudinal axes spaced at a greater distance from one of the table plate module edges than from a table plate module edge opposite the one edge, and the greater distance being more than half the width of the rectangular table plate module, the smaller width of the rectangular table plate module being of such dimension that contiguous ones of the continuous guiding tracks on a rectangular table plate module and on a square table plate module are in alignment,
      (2) the two guiding tracks of the guiding track device modules on the square table plate modules intersecting at an imaginary point of intersection on said diagonal,
      (3) a pivot shaft mounting the turntable module for rotation about the imaginary point of intersection for respective alignment of the guiding track of the turntable module with a selected one of the two guiding tracks of the guiding track device modules on the square table plate module, and
      (4) all the guiding track device modules on the square table plate modules being alike and interchangeable, and all the guiding track device modules on the rectangular table plate modules being alike and interchangeable,
   (c) a feed device module on the table plate modules for conveying the workpiece carriers,
      (1) all the feed device modules being alike and interchangeable, and
      (2) the table plate modules having means for receiving the guiding track device and feed device modules,
   (d) a positioning device module for positioning and stopping the workpiece carriers in selected positions,
      (1) all the positioning device modules being alike and interchangeable, and
      (2) the table plate moeule of the conveying and manual working modules each comprising means for receiving the positioning device modules, and
   the modular production plant further comprising
   (e) like coupling means for replaceably attaching the guiding track, feed and positioning device modules to the receiving means of the table plate modules, and
   (f) like coupling means for replaceably attaching the machine table modules of the conveying, deflector and manual working modules to each other.

2. The modular production plant of claim 1, further comprising a code sensing device module for sensing a code in a respective one of the workpiece carriers, all the code sensing device modules being alike and interchangeable, and the machine table module having means for receiving the code sensing device module, and like coupling means for replaceably attaching the code sensing device module to receiving means of the machine table module.

3. The modular production plant of claim 1, wherein the table plate modules have top and bottom surfaces defining symmetrical arrays of rows of bores for respectively receiving the guiding track device modules and feed device modules.

4. The modular production plant of claim 3, wherein the guiding track device modules comprise guiding track bars and respective rows of the bores are arranged to receive detachable coupling members for fastening the guiding track bars to the table plate modules, the table plate modules defining recesses in their surfaces between the rows of bores for receiving the positioning device modules, and other respective rows of the bores are of a cartridge-like construction for receiving the feed device modules.

5. The modular production plant of claim 4, wherein the positioning device module comprises a housing, a stop plate secured in the housing for stopping a respective one of the workpiece carriers in a working position, the stop plate being pivotal about a shaft extending parallel to the guiding track bars, the stop plate having a carrier plate adjustably mounted thereon for displacement parallel to the guiding track bars and carrying a series of replaceable stops arranged one behind the other, and oppositely directed displacing drives mounted in the housing at respective sides of the stopping plate for pivoting the stopping plate transversely to the guiding track bars.

6. The modular production plant of claim 1, wherein the manual working module comprises two of said machine table modules arranged successively in the conveying direction of the guiding track device module, each of said machine table modules of the manual working module being like the machine table modules of the conveying modules.

7. The modular production plant of claim 1, wherein each of the machine table modules of the conveying and deflector modules essentially consists of two vertical plate-like side components having upper ends, horizontally extending transverse struts interconnecting the two side components, the table plate module being supported on the upper ends of the side components and extending parallel to the transverse struts.

8. The modular production plant of claim 7, wherein the side components and struts of the machine table modules are identically constructed.

9. The modular production plant of claim 7, wherein the transverse struts of the machine table modules of the deflector modules extend parallel to the longitudinal direction of the guiding track device modules of the conveying modules.

10. The modular production plant of claim 1, wherein the manual working module has a machine table module essentially consisting of two of said table plate modules of the conveying module arranged successively in the conveying direction of the guiding track device module, the two table plate modules having distal and abutting adges extending perpendicularly to the opposed edges, two vertical plate-like side components having upper ends supporting the distal edges of the table plate modules, horizontally extending transverse struts interconnecting the two side components, the two table plate modules extending parallel to the transverse struts and the transverse struts being arranged only in the region of the one edges of the table plate modules, and a vertical support supporting the abutting edges of the two table plate modules, the table plate modules carrying coupling elements in the area of the guiding tracks for joining the abutting edges to the vertical support.

* * * * *